(12) United States Patent
Ravikiran et al.

(10) Patent No.: US 7,875,686 B2
(45) Date of Patent: Jan. 25, 2011

(54) POLYCYCLOOLEFIN POLYMERIC COMPOSITIONS FOR SEMICONDUCTOR APPLICATIONS

(75) Inventors: Ramakrisha Ravikiran, Strongsville, OH (US); Hendra Ng, Highland Heights, OH (US); Rajesh Raja Puthenkovilakom, North Royalton, OH (US); Linda Zhang, Broadview Heights, OH (US); Dino Amoroso, Medina, OH (US); Brian Knapp, Medina, OH (US); Andrew Bell, Lakewood, OH (US); Larry F. Rhodes, Silver Lake, OH (US)

(73) Assignee: Promerus LLC, Brecksville, OH (US)

( * ) Notice: Subject to any disclaimer, the term of this patent is extended or adjusted under 35 U.S.C. 154(b) by 1064 days.

(21) Appl. No.: 11/204,685

(22) Filed: Aug. 16, 2005

(65) Prior Publication Data

US 2006/0041093 A1 Feb. 23, 2006

Related U.S. Application Data

(60) Provisional application No. 60/602,364, filed on Aug. 18, 2004.

(51) Int. Cl.
*C08F 232/04* (2006.01)
*C08F 232/08* (2006.01)
*C08K 3/36* (2006.01)
*C08F 4/80* (2006.01)

(52) U.S. Cl. .................. 526/279; 526/256; 526/268; 526/281; 524/532; 524/849

(58) Field of Classification Search .............. 526/256, 526/268, 279, 281; 524/532, 849, 852; 156/329
See application file for complete search history.

(56) References Cited

U.S. PATENT DOCUMENTS

| | | | |
|---|---|---|---|
| 3,330,859 A | 7/1967 | Dexter et al. | |
| 3,644,482 A | 2/1972 | Dexter et al. | |
| 4,975,221 A | 12/1990 | Chen et al. | |
| 5,145,889 A | 9/1992 | Wada et al. | |
| 5,344,900 A | 9/1994 | Maezawa et al. | |
| 5,659,203 A | 8/1997 | Call et al. | |
| 5,930,597 A | 7/1999 | Call et al. | |
| 5,998,867 A | 12/1999 | Jensen et al. | |
| 6,121,689 A | 9/2000 | Capote et al. | |
| 6,232,417 B1 | 5/2001 | Rhodes et al. | |
| 6,265,530 B1 | 7/2001 | Herr et al. | |
| 6,297,560 B1 | 10/2001 | Capote et al. | |
| 6,388,037 B2 | 5/2002 | Schultz et al. | |
| 6,455,650 B1 | 9/2002 | Lipian et al. | |
| 6,518,186 B1 | 2/2003 | Wensel | |
| 6,518,677 B1 | 2/2003 | Capote et al. | |
| 6,524,960 B2 | 2/2003 | Wensel | |
| 6,537,851 B1 | 3/2003 | Lin et al. | |
| 6,538,087 B2 | 3/2003 | Zhao et al. | |
| 6,566,234 B1 | 5/2003 | Capote et al. | |
| 6,617,400 B2 | 9/2003 | Yeager et al. | |
| 6,617,401 B2 | 9/2003 | Rubinsztajn | |
| 6,664,646 B2 | 12/2003 | Wensel | |
| 6,677,681 B2 | 1/2004 | Wensel | |
| 6,699,929 B2 | 3/2004 | Musa et al. | |
| 6,707,165 B2 | 3/2004 | Wensel | |
| 6,911,518 B2 | 6/2005 | Lichtenhan et al. | |
| 2001/0053863 A1 | 12/2001 | Schultz et al. | |
| 2002/0032260 A1 | 3/2002 | Musa | |
| 2002/0128408 A1* | 9/2002 | Goodall et al. | 526/171 |
| 2003/0055193 A1 | 3/2003 | Lichtenhan et al. | |
| 2003/0181607 A1 | 9/2003 | Rhodes et al. | |

FOREIGN PATENT DOCUMENTS

WO 98/20394 5/1998

* cited by examiner

*Primary Examiner*—Fred M Teskin
(74) *Attorney, Agent, or Firm*—Bernard Berman

(57) ABSTRACT

Polymeric compositions for semiconductor applications comprising 10 to 99 wt. % of norbornene-type cycloolefin monomers represented by one or more of Formula I(a), I(b), and optionally I(c) and/or I(d), 0.0005 to 0.5 wt. % of an addition polymerization procatalyst, and optionally: up to 0.5 wt. % of a cocatalyst, up to 59 wt. % of a crosslinking monomer, up to 50 wt. % of a viscosifier, up to 20 wt. % of a thixotropic additive(s), up to 80 wt. % of a filler, up to 10 wt. % of an antioxidant, and up to 0.6 wt. % of an antioxidant synergist, the total of the components of the formulation adding up to 100%. Such formulations are mass polymerized, or cured, to form polymeric compositions that have properties desirable for a variety of specific electronic, microelectronic, optoelectronic and micro-optoelectronic applications such as die attach adhesives, underfill materials, prepreg binders, encapsulants, protective layers, and other related applications.

12 Claims, No Drawings

POLYCYCLOOLEFIN POLYMERIC COMPOSITIONS FOR SEMICONDUCTOR APPLICATIONS

CROSS-REFERENCE

This application claims the benefit of priority under 35 U.S.C. § 119 of U.S. Provisional Application Ser. No. 60/602,364, filed on Aug. 18, 2004.

BACKGROUND

Semiconductor devices are expanding their uses in a variety of electronic, microelectronic, optoelectronic and micro-optoelectronic applications. The assembly of such devices requires the use of materials that can provide a broad range of properties for applications such as die attach adhesives, underfill materials, prepreg binders, encapsulants, protective layers, and other related applications. To be useful, such materials should have the ability to be formulated for the specific physical and chemical properties of a particular application. Such properties include, but are not limited to, appropriate adhesion, thermo-mechanical properties such as coefficient of thermal expansion (CTE) and modulus of elasticity (Modulus), temperature stability, optical properties such as clarity or color and moisture resistance. Issues with current materials namely, epoxies, are related to high moisture absorption and inadequate thermal stability/decomposition temperature and yellowing at high temperature.

A number of polymeric materials are currently available for such applications. These materials include curable allylated amide compounds, curable vinyl ethers as well as curable silicone compositions, epoxy compositions, polyimide compositions and acrylic compositions. However, often these available materials do not provide all of the desired properties of a specific application, and are employed only as a best available choice. That is to say, a user often has to choose good performance with respect to one desired property at the expense of less than desirable performance in another. Therefore it would be desirable to provide a material that provides good performance over a broader range of such properties for such exemplary applications.

DETAILED DESCRIPTION

Embodiments in accordance with the present invention are useful for a variety of electronic, microelectronic, optoelectronic and micro-optoelectronic applications. Such applications include, but are not limited to chip and light emitting diode (LED) encapsulants, board and chip protective coatings, high temperature wire coatings, dielectric films and adhesive applications such as die attach adhesives, underfill adhesives, laminating adhesives, conductive adhesives, reworkable adhesives, directly photodefinable adhesives, and the like. In addition, some embodiments of the present invention are useful as dielectric layers often encompassed within one or more of the aforementioned applications.

Exemplary embodiments in accordance with the present invention will be described herein below. Various modifications, adaptations or variations of such exemplary embodiments described herein may become apparent to those skilled in the art as such are disclosed. It will be understood that all such modifications/adaptations or variations that rely upon the teachings of the present invention, and through which these teachings have advanced the art, are considered to be within the scope and spirit of the present invention.

The term "norbornene-type" is used herein to mean a monomer material that contains at least one norbornene moiety in accordance with Structure A shown below, or a polymeric material that was formed from such monomers and that has at least one repeat unit in accordance with Structure B, also shown below:

It will be understood that where various compounds are described as monomers and/or polymerizable monomers, that such compounds are structurally analogous to Structure A, above. That is to say, such compounds have a polymerizable double bond as shown in A above. It will also be understood, that when such monomers are polymerized, they are incorporated into a polymer structure as "repeat units" or "repeating units" that are structurally analogous to Structure B, above. That is to say that, the polymerization occurs across the double bond of Structure A as shown in Structure B.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Various numerical ranges are disclosed in this patent application and recited in the attached claims. Unless specifically indicated to the contrary, each range is a continuous range including every value between and including the minimum and maximum values of such range.

As used herein, the term "polymer composition" is meant to include a synthesized polymer having a backbone encompassing repeat units derived from norbornene-type monomers, as well as residues from initiators, catalysts, and other elements attendant to the synthesis of the polymer, where such residues are understood as not being covalently incorporated thereto. Such residues and other elements considered as part of the polymer composition are typically mixed or co-mingled with the polymer such that they tend to remain with the polymer when it is transferred between vessels or between solvents or dispersion media. Such polymer compositions also include materials added to provide specific properties to the polymer composition.

As used herein, the term "lower" when used as an adjective to qualify alkyl, alkenyl and alkynyl groups will be understood to mean such groups having six or less carbon atoms.

As used herein, the term "viscosifier" means a material added to a formulation for adjusting or modifying the viscosity of such a formulation. In some embodiments a polymeric viscosifier, miscible with the formulation, is used, while in other embodiments an immiscible filler is used.

As used herein, the term "thixotropic agent" means a viscosifier that when added to a formulation, provides such formulation with thixotropic properties, that is to say, provides the formulation with the property of becoming less viscous when disturbed and returning to an original viscosity after the disturbance is removed.

As used herein, the term "filler" means a material added to a formulation to alter a physical property of a cured formulation, in some embodiments in accordance with the present invention, fillers are also viscosifiers.

It will be understood, that while some materials employed in embodiments of the present invention can advantageously serve as one or more of a viscosifier, a thixotropic agent and a filler, that is, some materials are capable of broad purpose, but in some embodiments materials are used for a specific purpose, that is to say, separate materials are used as a viscosifier, a thixotropic agent or a filler.

Advantageously, formulation embodiments in accordance with the present invention are mass polymerized, or cured, to form polymeric compositions that have properties desirable for a variety of specific applications. Such embodiments will, therefore, vary as a function of, among other things, the particular end-use application. For example, formulation embodiments for a die attach adhesive application will differ from formulation embodiments for underfill applications. Although it is desirable for most applications that the composition possesses moisture resistance and good adhesion to the one or more substrates employed in the application, other properties can vary. For example, formulations useful as a LED encapsulant will additionally posses optical properties appropriate to the type of LED it is employed with. Consequently, embodiments in accordance with the present invention encompass various formulations containing different ingredients depending on the specific intended use. Embodiments of this invention directed to typical formulations useful for electronic and microelectronic applications can include:

a). 10 to 99 wt % of cycloolefin monomers represented by one or more of Formulae I(a), I(b), and optionally I(c) and/or I(d), generally 65 to 95 wt. %;

b). 0.0005 to 0.5 wt. % of a procatalyst, generally 0.01 to 0.2 wt. %; and optionally:

c). up to 0.5 wt. % of a cocatalyst, generally 0.02 to 0.25 wt. %;

d). up to 59 wt. % of a crosslinking monomer, generally up to 20 wt. %;

e). up to 50 wt. % of a viscosifier, generally up to 35 wt. %;

f). up to 20 wt. % of a thixotropic additive(s), generally up to 15 wt. %;

g). up to 80 wt. % of a filler, generally up to 70 wt. %;

h). up to 10 wt. % of an antioxidant, generally up to 1.2 wt %;

i). up to 0.6 wt. % of an antioxidant synergist, generally up to 0.3 wt. %.

All percentages of the above listed components are based on the total weight of the composition where any specific amount can be adjusted to provide the desired properties for the intended end-use application.

Embodiments of the present invention include formulations that are particularly useful for encapsulant and underfill applications for semiconductor components, such as semiconductor chips, light emitting diodes (LEDs), CMOS (complementary metal oxide semiconductor) devices, imaging CMOS (IMOS) devices, other optical components, optoelectronic components or micro-optoelectronic components. For encapsulants, which cover or encapsulate a chip or a sensitive electronic device, the formulation, after polymerization or curing, results in a polymeric composition that possesses appropriate optical properties, good adhesion, minimal shrinkage during cure, acceptable coefficient of thermal expansion (CTE), acceptable modulus and toughness, acceptable hardness, all or some of which may be more or less important, depending on the specific application.

Encapsulant formulations in accordance with this invention encompass:

j). 10 to 99 wt. % of cycloolefin monomers represented by one or more of Formulae I(a), I(b), and optionally I(c) and/or I(d), generally 60 to 85 wt. %;

k). 0.008 to 0.2 wt. % of an addition polymerization procatalyst, generally 0.01 to 0.05 wt. %. and optionally:

l). up to 0.25 wt. % of a cocatalyst, generally up to 0.1 wt. %;

m). up to 45 wt. % of a crosslinking monomer, generally up to 35 wt. %;

n). up to 50 wt. % of a viscosifier, generally up to 40 wt. %;

o). up to 20 wt. % of a thixotropic additive, generally up to 10 wt. %;

p). up to 1.5 wt. % of an antioxidant, generally up to 1.0 wt. %;

q). up to 0.6 wt. % of an antioxidant synergist, generally up to 0.3 wt. %.

For underfill embodiments of the present invention, some desirable properties of the resulting polymeric composition include, but are not limited to, a low coefficient of thermal expansion (CTE) generally from 20 to 50 ppm/° C.), good adhesive properties (pass or exceed the appropriate JEDEC Level 2 standard) and minimal shrinkage during cure ($\leq 0.5\%$).

Embodiments of underfill formulations in accordance with this invention include:

r). 10 to 60 wt. % of cycloolefin monomers represented by one or more of Formulae I(a), I(b), and optionally I(c) and/or I(d), generally 20 to 50 wt. %;

s). 0.008 to 0.3 wt. % of a procatalyst and generally 0.01 to 0.05 wt. %, and optionally:

t). up to 0.25 wt. % of a cocatalyst and generally up to 0.1 wt. %;

u). up to 10 wt. % of a crosslinking monomer and generally up to 10 wt. %;

v). up to 50 wt. % of a viscosifier and generally up to 10 wt. %;

w). up to 80 wt. % of a thixotropic additive and generally up to 70 wt. %;

x). up to 1.5 wt. % of an antioxidant and generally up to 1.0 wt %; and y). up to 0.6 wt. % of an antioxidant synergist and generally up to 0.3 wt. %.

Embodiments in accordance with the present invention advantageously provide mass polymerization formulations that result in "optical" quality polymers or films. Such films allow for the fabrication of a variety of optical devices, including, but not limited to, micro lens arrays, optical waveguides, holographic patterns and gratings. Application for such optical devices include, among others, lens covers for CCD (charge coupled device) or CMOS cameras, components of a Liquid Crystal Display, or other display technologies, projection displays and projection lithography applications.

In some device embodiments of the present invention, structures are formed by dispensing an uncured, liquid formulation over a substrate. Any appropriate dispensing technique can be used, including but not limited to, ink jet dispensing and/or printing, screen or stencil printing, and by fluid dispense techniques using equipment manufactured by, among others, Asymtek®. Using such techniques, the formulations can be disposed onto, for example, a mold substrate that bears desirable physical features and cured. Following the cure, the physical features of the exemplary mold are replicated onto the cured film and through the film incorporated into the device. Another method of forming these micro patterns is by micro replication or micro imprinting of a cured or a partially cured film into appropriate shapes and structures.

Some embodiments of the invention are useful in LED encapsulant applications, the liquid formulation is dispensed into a high reflectance cavity molded out of a poly(phthalamide) (PPA) or other appropriate material such as a Liquid Crystal Polymer. In some instances, the cavity can be in the form of a ceramic or a ceramic coated with a reflective metal such as silver or gold. Within the cavity, an LED chip electrically coupled to conductive pads using gold wire bonds or another appropriate coupling method is also present. The liquid formulation is dispensed into the cavity and cured. Generally the cured material will have to demonstrate sufficient adhesion to these various substrates to pass electronic reliability tests such as solder reflow or JEDEC Level preconditioning tests and temperature cycling tests.

Some embodiments of this invention include formulations that are effective as adhesives for electronic components, for example as die attach adhesives. Upon polymerization or curing, the formulation will provide a polymeric composition that has desirable adhesive properties and is convenient to apply. Such adhesive formulation embodiments encompass:

z). 40 to 99 wt. % of cycloolefin monomers represented by one or more of Formulae I(a), I(b), and optionally I(c) and/or I(d), generally 70 to 95 wt. %;

aa). 0.008 to 0.3 wt. % of a procatalyst, generally 0.01 to 0.2 wt. %; and optionally:

bb). up to 0.5 wt. % of a cocatalyst, generally up to 0.25 wt. %;

cc). up to 45 wt. % of a crosslinking monomer, generally 0 to 35 wt. %;

dd). up to 40 wt. % of a viscosifier, generally up to 20 wt. %;

ee). up to 20 wt. % of thixotropic additive(s), generally up to 10 wt. %;

ff). up to 10 wt. % of an antioxidant, generally up to 1.0 wt %;

gg). up to 0.6 wt. % of an antioxidant synergist, generally up to 0.3 wt. %; and hh). up to 1 wt. % of a pigment, generally up to 0.5 wt. %.

It will be understood that the specific amount of any one component of the adhesive formulation presented immediately above, as well as the those formulations previously mentioned are generally selected and/or adjusted to provide the desired performance of a resulting polymeric composition tailored for a specific intended end-use application.

Thermoset adhesives generally experience some shrinkage during cure. For many of the applications where embodiments of the present invention are useful, shrinkage stress generated during cure should be minimized or at least controlled. High cure shrinkage stress can cause delamination of the adhesive from the substrate or can cause relative movement between bonded parts. The substrate may break when the adhesive shrinkage stress exceeds the tensile strength of the substrate. Advantageously, the adhesive embodiments in accordance with this invention demonstrate unexpectedly low cure shrinkage stress. For this reason such adhesives are particularly suitable for use as die attach adhesives, for example for attaching large die used in the forming of print heads used in "ink jet" printing devices.

Adhesives useful in print heads, are robust enough to withstand the harsh environment of the inks they are generally exposed to while in such print heads. That is to say that such adhesive. embodiments of the present invention are only minimally affected by the chemical interactions with the ink(s) to which it is generally exposed. In addition, such adhesives are formulated to meet specific die bow[1] specifications that will eliminate or reduce die cracking failures of the currently employed formulations. In addition, such adhesive embodiments act as a robust adhesive for most all substrate materials used in microelectronic and optoelectronic applications. Exemplary substrate materials include, but are not limited to, filled materials encompassing one or more of: polyphenylene sulfide (PPS), poly(phthalamide) (PPA), acrylonitrile butadiene styrene polymer (ABS) and liquid crystal polymers (LCPs). To meet such requirements, the polymer composition embodiments of the present invention possesses a low Modulus (typically 500 MPa or less), low cure temperature (150° C.), and low ink uptake (<4.0% by weight after 20 days of immersion at 70° C.). Advantageously, adhesive embodiments of this invention can be tailored to exhibit the desirable rheology that will enable the formulation to maintain its shape after being disposed over a substrate prior to and after the cure.

[1] Die Bow is understood to mean concave or convex deformation of the die due to differences in the CTE of adjoining materials. Specific values for De Bow are a function, among other things, of die thickness, substrate material to which the die is attached and the material used for such attachment.

The adhesive application method requires the dispensing of an unpolymerized formulation onto a substrate where the dispensed formulation must maintain its shape prior to and after cure. To attain the necessary rheology, a viscosifier and/or a thixotropic additive is generally used in such formulations. Advantageously, such formulations can also be tailored to attain ease of dispensing in an automatic dispenser such as Asymtek® Century C720M or the like while retaining the type of rheology mentioned above. The resulting compositions exhibit good physical properties, especially minimal distortion and cure shrinkage stress, good chemical resistance to ink and high retention of adhesion to substrates after high temperature ink soak, minimum die bow and minimum loss of uniformity of the surface.

Although it may be more convenient to dispense a one component formulation of an embodiment of the present invention, that is, a single formulation that contains all the necessary ingredients, in some embodiments of this invention a two component formulation is desirable. Advantageously, embodiments in accordance with the present invention generally provide for such an alternative form.

The dispensing of a two component system generally requires a dispenser that has the capability of thoroughly mixing the two components as they ate being dispensed. In such a system, it is often useful to incorporate different pigments in each component, such as yellow in one and blue in the other, so that after both components have been dispensed, it is easy to see whether the two components have been thoroughly mixed simply by observing the color of the mixed and dispensed formulation. The properties of the two component formulations after curing are generally substantially equivalent to such properties after curing of the one component formulations. In some situations or applications, the two component formulations may be more convenient or more appropriate to employ than the one component formulations.

Some formulation embodiments of the present invention can be used for LED applications. For such embodiments the formulation is generally dispensed into an LED cavity using an automated dispense mechanism, e.g. an Asymtek In this instance, the formulation has a much lower viscosity than a similar material formulated for an adhesive application, as the LED formulation is required to flow into a cavity and around the various components and structures therein.

While various dispense techniques, such as Asymtek and ink-jet printing may be used for applications where formulation embodiments of the present invention are employed, depending on the specific application, one can envision other techniques for providing the formulation, such include, but are not limited to, resin transfer molding, screen printing and stencil printing.

Monomers

Embodiments in accordance with the present invention employ monomers that encompass (a) at least one cycloolefin containing pendant alkyl group(s), (b) at least one cycloolefin containing pendant silyl groups, and optionally (c) at least one cycloolefin containing pendant groups selected from aryl and aralkyl, esters of carboxylic acid, alkyl ethers, and glycidyl ethers, as described below. The polycycloolefin monomers are addition polymerized in the presence of a single or multi-component Group VIII transition metal catalyst, in particular a palladium compound.

In the embodiments of the invention, a first type of polymerizable cycloolefin monomer set forth in (a) encompasses one or more monomers represented by Formula I(a) below:

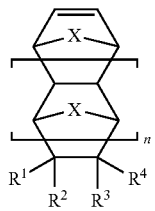

I(a)

where X represents —$CH_2$—, —$CH_2CH_2$—, —O— or —S—; n is an integer from 0 to 5 inclusive; and at least one of $R^1$ to $R^4$ independently represents hydrogen or a pendant linear and branched ($C_4$-$C_{12}$) alkyl substituent. Exemplary alkyl groups include but are not limited to hexyl, heptyl, octyl, nonyl, decyl, and dodecyl. When at least one of $R^1$ to $R^4$ is ($C_4$ to $C_{12}$) alkyl, the remaining substituents can be independently selected from hydrogen and $C_1$-$C_3$ alkyl. Generally X is —$CH_2$—.

Representative monomers encompassed by Formula I(a) include, but are not limited to 5-butylbicyclo[2.2.1]hept-2-ene (5-butylnorbornene or BuNB), 5-i-butylbicyclo[2.2.1]hept-2-ene (5-i-butylnorbornene or iBuNB), 5-hexylbicyclo[2.2.1]hept-2-ene (HxNB) and the like.

These compounds may also be named in terms of norbornene, for example, 5-decylbicyclo[2.2.1]hept-2-ene, shown below, can be interchangeably referred to as decyl norbornene (Decyl NB).

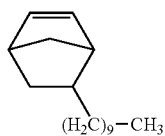

Embodiments in accordance with the present invention can also employ a second type of polymerizable cycloolefin monomer. Such monomers are represented by Formula I(b) below:

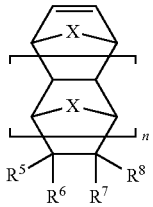

I(b)

where X and n are as defined above and at least one of $R^5$ to $R^8$ independently represents a pendant silyl group of the formula:

—$(CH_2)_m$—Si($R^{13}$)($R^{14}$)($R^{15}$)

where m is an integer from 0 to 6 and $R^{13}$, $R^{14}$ and $R^{15}$ each independently represents hydrogen, linear or branched $C_1$-$C_6$ alkyl, linear or branched $C_1$-$C_6$ alkoxy, $C_3$-$C_8$ cycloalkyloxy, linear or branched alkyl oxyether, aryl, $C_1$-$C_6$ alkyl-substituted aryl and aryloxy, $C_1$-$C_6$ alkyl carboxylates, oxyalkylene norbornene, aminoalkylene norbornene and oxyalkylene epoxides, the remaining of $R^5$ to $R^8$ is independently selected from hydrogen, $C_1$-$C_3$ alkyl and linear and branched $C_1$-$C_6$ alkoxy. Representative monomers encompassed by Formula I(b) include, but are not limited to: 5-(trimethoxysilyl)norbornene (TMSNB), 5-(triethoxysilyl)norbornene, 5-methyldimethoxysilylnorbornene, 5-dimethylmethoxyethylnorbornene, 5-(trimethoxysilylethyl)norbornene, 5-tri(ethoxy)silylethylnorbornene, 5-(trimethoxysilylbutyl)norbornene, 5-(trimethoxysilylhexyl)norbornene, norborneneethyl dimethyl methoxy silane norborneneethyldimethyl ethoxy silane, norborneneethyl dimethyl methoxyethoxy silane, and the like.

TMSNB

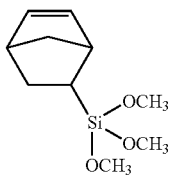

A linear alkyl oxyether is represented by the following generic formula

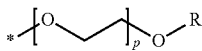

where p is an integer of 1 to 10 and is generally 2 (e.g., diethyleneoxide alkyl ether derived from glycol) and R is a $C_1$-$C_6$ linear alkyl moiety. The above mentioned aryl containing groups may be illustrated by phenyl, tolyl, naphthyl, biphenyl, dimethyl or diethyl phenyl, phenoxy, naphthoxy, and the like. "Lower alkyl carboxylate" groups may be illustrated by the formula:

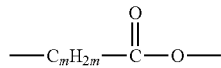

where m is an integer of 0 to 6 and includes such groups as the carbonyl, formate, acetate, propionate and the like. The "oxyalkylene epoxide" group can be illustrated by the structure

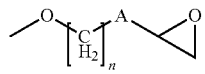

where n is an integer from 0 to 5 and generally 1 or 2 and A is a group derived from a straight or branched chain alkyl group having 1 to 10 carbons and generally 2 to 4 carbons or from cycloalkyl having 3 to 8 carbons forming epoxy groups such as oxyglycidyl or oxymethylenecyclohexyl epoxide or oxypropylenecyclooctyl epoxide and the like. Exemplary silyl groups include, but are not limited to, trimethoxysilyl and triethoxysilyl. When at least one of $R^5$ to $R^8$ is silyl, the remaining substituents can be independently selected from hydrogen and $C_1$-$C_3$ alkyl. Generally X is —$CH_2$—.

One skilled in the art will appreciate that monomers reflective of Formula I(b), e.g. monomers encompassing alkoxy, amide and ester pendant groups, can be prepared from an appropriate silyl chloride moiety. Preparation of such monomers are disclosed in greater detail in published PCT Application 2003/0055193 A1 and U.S. Pat. No. 6,844,409 B2.

Some embodiments of the invention, encompass one or more polymerizable cycloolefin monomers represented by Formula I(c) below:

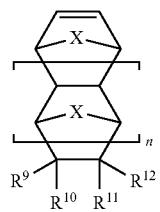

I(c)

where X, m and n are as defined previously and each of $R^9$ to $R^{12}$ independently represents hydrogen, $C_1$-$C_3$ alkyl, aryl, —$(CH_2)_m$—O—$R^{16}$, —$(CH_2)_m$—C(O)O$R^{16}$, or the groups:

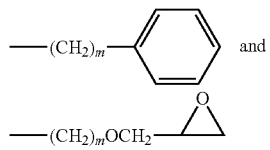

where $R^{16}$ is a linear and branched $C_1$-$C_5$ alkyl group and phenyl and X is generally —$CH_2$—. Representative monomers described under Formula I(c) include, but are not limited to, 5-phenylnorbornene, 5-phenylethylnorbornene (PENB), 5-methoxycarbonylnorbornene, 5-ethoxycarbonylnorbornene, 5-n-propoxycarbonylnorbornene, 5-i-propoxycarbonylnorbornene, 5-n-butoxycarbonylnorbornene, 5-(2-methylpropoxy)carbonylnorbornene, 5-(1-methylpropoxy)carbonylnorbornene, 5-t-butoxycarbonylnorbornene, 5-cyclohexyloxycarbonylnorbornene, 5-(4'-t-butylcyclohexyloxy)carbonylnorbornene, 5-phenoxycarbonylnorbornene, 5-[(2,3-epoxypropoxy)methyl]-2-norbornene (methyl glycidyl ether norbornene), 5-benzylnorbornene, and the like.

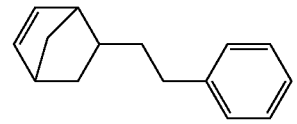

PENB

Some embodiments in accordance with the present invention, encompass polymerizable monomers such as hydrogenated dicyclopentadiene prepared by the reaction of cyclopentadiene with a cyclopentene, as shown below, to form a monomer represented by Formula I(d), where $R^{50}$ is hydrogen or a linear or branched $C_1$ to $C_6$ alkyl group.

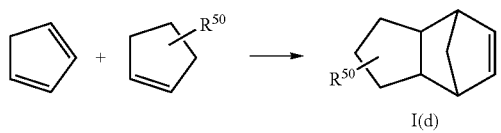

I(d)

Crosslinking Monomers

Some embodiments of the present invention contemplate the use of yet another type of polymerizable cycloolefin monomer, a crosslinking monomer. Crosslinking will generally create an interpenetrating network which will modify the modulus and generally improve the toughness of the resulting composition. CrosslinkirLg can also be used to tailor glass transition temperature (Tg), CTE and solvent resistance. Any crosslinking monomer that does not interfere with the function of the catalyst may, in principle, be employed.

Monomers of this type can encompass an olefinic unsaturation that can be polymerized in the presence of a Group VIII transition metal catalyst, such as those discussed below, and yet it also contains a pendant reactive site (functional group) that can be crosslinked after polymerization, for example, after spin coating a formulation encompassing repeat units derived from such monomers such, by exposing the polymeric composition to UV light or other forms of radiation. In some cases, to attain the desired physical properties, it would be beneficial to facilitate such latent crosslinking. It is important to note that when such latent crosslinkable monomers are included in a polymerizable formulation, the polymerization is carried out in solution and not in mass.

Illustrative examples of latent crosslinkable monomers are exemplified below:

Latent Crosslinkable Monomers

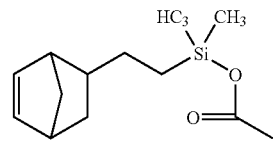

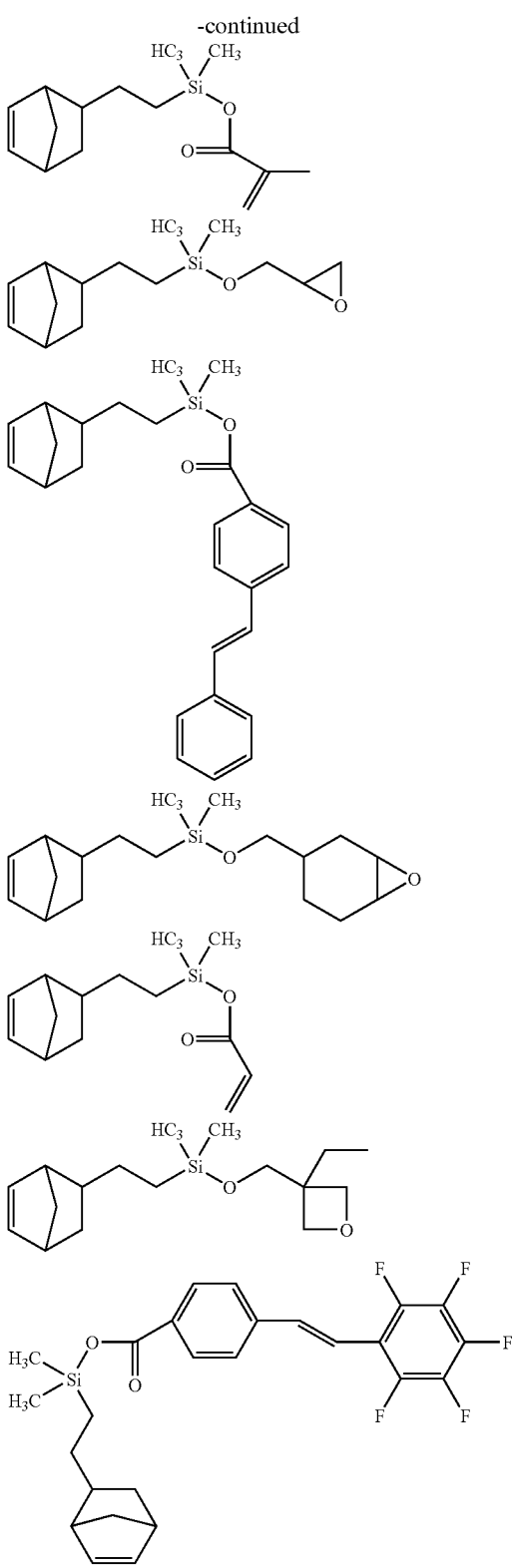

These monomers may be prepared employing the above mentioned method disclosed in greater detail in published U.S. Pat. No. 6,911,518 B2 and in published U.S. Published Patent Application Ser. No. 2003/0055193 A1 by first preparing the precursor compound norbornene ethyl dimethylsilyl chloride which is then reacted with an appropriate compound to yield the desired crosslinkable monomer.

In the above shown monomers, the norbornene olefinic bond can be conveniently polymerized in solution in the presence of a Group VIII transition metal catalyst disclosed herein, but the remaining functional groups would be available to undergo crosslinking following polymerization and process steps that the resulting polymer is subjected to. In one instance, this could be spin coating onto an inorganic substrate. Crosslinking can occur upon subjecting the polymer to thermal excursion or actinic radiation in the presence or absence of additional materials that could promote the crosslinking reactions. Such materials may include but are not limited to photoacid generators, thermal acid generators and radical generators—photochemical and thermal.

Monomers of this type can also encompass crosslinking monomers that are norbornene moiety-containing multi-functional monomers. A disclosure of such multi-function crosslinking monomers is in U.S. Pat. No. 6,538,087, col. 37, line 30, to col. 43, line 31, which part of said patent is incorporated herein by reference.

Yet another type of norbornene moiety-containing crosslinking monomers encompassed by embodiments of the present invention are compounds represented by Formula II below Formula II

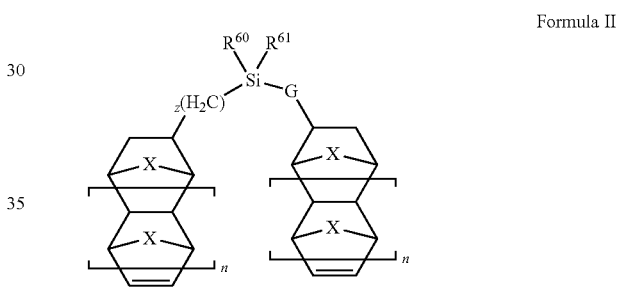

where X represents —CH$_2$—, —CH$_2$CH$_2$—, —O— or —S—; n is an integer from 0 to 5 inclusive; z is an integer from 1 to 6, typically 2; G is —O—, —NH—, —O—Y—, or —NH—Y— where Y is an unsubstituted C$_1$ to C$_4$ alkylene or a substituted C$_1$ to C$_2$ alkylene where the substituents are selected from —CF$_3$ groups, a carbonyl group, and a ester group. An exemplary method of preparation of such monomers encompasses first reacting vinyl norbornene with chlorodimethyl silane in the presence of chloroplatinic acid catalyst and thereafter reacting the product (norbornene ethyl dimethylsilyl chloride) with the appropriate reagent, such as NBOH, NBNH$_2$ or NBCOOH to yield the desired norbornene moiety-containing crosslinking monomer of Formula II.

It should be noted that cycloolefin monomers represented by Formula I(c) may or may not fully polymerize with cycloolefin monomers represented by Formulas I(a) and I(b). It is likely that at least part of the Formula I(c) monomer will polymerize and that any remaining monomer will be involved in forming some sort of an interpenetrating network. It is possible, however, that most of the Formula I(c) monomer is primarily involved in forming the interpenetrating network. Regardless of whatever its involvement in the polymer formulation, the presence of Formula I(c) monomers in the formulations of this invention appear to improve many of the desirable properties of the resulting polymer compositions.

In some embodiment of the invention, the ratio of monomers used in the polymerizable monomer composition comprises from about 1 to about 99 mol % of at least one polycyclic monomer defined under Formula I(a) and from about 1 to about 99 mol % of at least one polycyclic monomer defined under Formula I(b). In another embodiment of the invention the ratio of monomers used in the polymerizable monomer composition comprises from about 20 to about 80 mol % of at least one polycyclic repeating unit defined under Formula I(a) and from about 20 to about 80 mol % of at least one polycyclic monomer defined under Formula I(b). In another embodiment, the polymerizable monomer composition comprises from about 30 to about 70 mol % of at least one polycyclic repeating unit defined under Formula I(a) and from about 30 to about 70 mol % of at least one polycyclic repeating unit defined under Formula I(b). In still another embodiment of the invention, the polymerizable monomer composition comprises from about 40 to about 60 mol % of at least one polycyclic monomer defined under Formula I(a) and from about 40 to about 60 mol % of at least one polycyclic monomer defined under Formula I(b). In a further embodiment of the invention the monomer ratio in the polymerizable monomer composition is 50 mol % of at least one monomer described under Formula I(a) and 50 mol % of at least one monomer described under Formula I(b). In a still further embodiment monomers of Formula I(a) are present in the amount of about 20 to about 80 mol %, monomers of Formula I(b) are in the amount of about 5 to about 50 mol %, and monomers of Formula I(c) are in the amount of about 1 to about 50 mol %.

In still another embodiment of the invention, the polymerizable monomer composition containing at least one polycyclooolefin monomer defined under Formula I(a) and at least one polycyclooolefin monomer described under Formula I(b) further comprises from 0 to about 98 mol % of a at least one polymerizable polycyclooolefin monomer selected form Formula I(c). In a further embodiment, the compositions of this invention may contain about 1 to about 15 mol % or about 1 to about 10 mol % or about 2 to about 8 mol % of at least one cyclooolefin of Formula I(c). It will be evident to one of ordinary skill that when at least one monomer described under Formula I(c) is present in the polymerizable monomer composition, the mol % of one or both of the monomers of Formulas I(a) and I(b) will be reduced accordingly. In other words, the total amount of monomers set forth under Formulas I(a), I(b) and I(c) can not exceed 100 mol %.

Polymerization

Compositions in accordance with embodiments of the present invention can vary greatly, but generally encompass a mixture of monomers such as those represented by one or more of Formulae Ia, Ib, Ic and II, with the proviso that monomers represented by Formula II are only present with one or more of monomers represented by Formulae Ia, Ib or Ic. Some embodiments may contain a polymer viscosifier, while other embodiments may contain a inorganic filler. Still other embodiments may contain combinations of such viscosifier and filler. Not withstanding the type of composition from above, such compositions are polymerized in the presence of a single or multi-component Group VIII transition metal catalyst.

The palladium containing compounds useful as procatalysts (sometimes also referred to as initiators) for polymerizing the disclosed monomer compositions of the invention can be prepared as a preformed single component catalyst or as a multi-component catalyst prepared in situ by mixing a palladium containing procatalyst compound with a cocatalyst or activator in the presence of the desired monomer(s) to be polymerized.

The preformed catalyst can be prepared by mixing the Group VIII transition metal catalyst precursors such as the palladium containing procatalyst compound and the activator compound, generally referred to as a cocatalyst, in an appropriate solvent, allowing the reaction to proceed under appropriate temperature conditions, and isolating the reaction product to obtain a preformed catalyst. By procatalyst is meant that a palladium containing compound is converted to an active catalyst compound by a reaction with a cocatalyst or activator compound. The synthesis of representative single component and in situ generated palladium containing catalyst compounds are set forth in US 2003/0181607 A1, supra.

Representative procatalyst compounds in accordance with the above disclosed formula include, but are not limited to, palladium acetate (Pd-224), (allyl)palladium (tricyclohexylphosphine)triflate (Pd-577), (allyl)palladium(triisopropylphosphine)triflate (Pd-456), (allyl)palladium(tricyclohexylphosphine)trifluoroacetate (Pd-541), (allyl) palladium (triisopropylphosphine)trifluoroacetate (Pd-421), (acetonitrile)bis (triisopropylphosphine)palladium(acetate) tetrakis(penta fluorophenyl) borate (Pd-1206), (acetonitrile) bis(tricyclohexylphosphine)palladium(acetate)tetrakis (pentafluorophenyl) borate (Pd-1446), [bis (triisopropylphosphine)(hydrido) palladium(acetonitrile)] tetrakis (pentafluorophenyl) borate (Pd-1149), bis (triisopropylphosphine)palladium(II)bis(acetate) (Pd-545) and bis(tricyclohexylphosphine) palladium(II) bis(acetate), (Pd-785).

Representative cocatalysts or activator compounds include, but are not limited to, lithium tetrakis(pentafluorophenyl) borate (LiFABA), N,N-dimethylanilinium tetrakis (pentafluorophenyl) borate (DANFABA) and Dimethyl(2-(2-naphthyl)-oxoethyl)sulfonium tetrakis (pentafluorophenyl) borate (TAG-372, Toyo Ink).

Palladium procatalyst compounds generally exhibit high activity at monomer to pro-catalyst molar ratios (i.e., monomer to palladium metal) of over 100,000:1. In some embodiments of the invention, monomer to procatalyst ratios can range from about 100,000:1 to about 1,000,000:1. In other embodiments, from about 100,000:1 to about 500,000:1, and in still other embodiments from about 120,000:1 to about 250,000:1. While these catalysts have been found to be active at monomer to catalyst metal molar ratios of over 100,000:1, it should be recognized that it is within the scope of this invention to utilize monomer to catalyst metal molar ratios of less than 100,000:1. Depending on the activity of a particular catalyst, the reactivity of the selected monomer(s), the desired molecular weight, or desired polymer backbone tacticity, higher concentrations of catalyst to monomer loading are well within the scope of the present invention (i.e., monomer to catalyst loadings of 50:1 to 100,000:1). It should also be noted that in some embodiments in accordance with the present invention, procatalyst to cocatalyst ratios are controlled to be from 1:0 to 1:10 (molar ratio). In other exemplary embodiments such ratio is controlled from 1:0 to 1:4, where the specific ratio employed is a function of, among other things, the relative reactivity of the procatalyst and cocatalyst components and the desired working life of the final composition.

It will be noted that generally formulation embodiments of the present invention can be used for either mass or solvent polymerization applications, further where crosslinking monomers such as are disclosed in the '087 patent or in accordance with Formula II are employed, such will be for mass polymerization embodiments of the present invention, while latent crosslinking monomers, such as those illustrated above, are generally employed for solution polymerization embodiments. It will noted that regardless of whether solution or mass polymerization is employed, the cocatalyst and/or procatalyst are added by first forming a solution of such in an organic solvent such as toluene, tetrahydrofuran, methylene chloride and the like.

Viscosifiers

As previously mentioned, viscosifiers are materials that adjust or modify the viscosity of a formulation. Without a viscosifier, a composition may have a very low viscosity making it problematic for certain uses. For example, when such a low viscosity composition is dispensed on a surface it can flow in all directions making it difficult to control the resultant layers' formation. The amount of the viscosifier added will depend on the specific viscosifier used as well as on the viscosity of the composition desired, generally this will be from 1 to 50 wt. % based on the total weight of the monomers and viscosifier(s) in the solution.

Some useful viscosifiers are norbornene-type polymers. Such polymers are generally obtained through the polymerization of monomers such as those previously discussed. It will be noted that while norbornene-type polymers are generally employed, any polymer capable of being dissolved in the formulation and capable of modifying the viscosity of that formulation can be used.

The useful polymers and the catalysts that may be used to obtain such polymers are disclosed in greater detail in U.S. Pat. No. 6,455,650 (PCT published application WO 00/20472) which is incorporated herein by reference. For the encapsulant compositions which employ a viscosifier and for which specific optical properties are desirable, for example optical clarity, it should be realized that selection of the viscosifier can influence such optical properties. Thus, in some embodiments it is advantageous to use a polymer obtained from the same monomers that are contained in the encapsulant formulation as a viscosifier where obtaining an optically clear composition is desirable. The average molecular weight (MW) of this polymer can range from 50,000 to $1 \times 10^6$. The polymer is dissolved in the monomer formulation which is then polymerized or cured. Thus, if the monomers used in the formulation are, for example, decyl norbornene and trimethoxysilyl norbornene, then a polymer useful as a viscosifier would be a another polymer of these monomers with appropriate properties.

Silica is another example of a useful viscosifier. There are various types of silica and it is important to employ the appropriate type depending on the specific end-use application. For adhesive formulations, non-optical type silica are generally useful, for example, any appropriate Cabosil® fumed silica can be used (Cabot Corp.).

However, for an optical end use application, a nano silica is generally employed. For nano silicas, particle size is generally less than 50 nanometers (nm) and nano silica used in some embodiments of the present invention have a particle size of less than 25 nm. One such exemplary silica employed in encapsulant formulation embodiments of the present invention is silica sol (grade PL-2L-Tol) from FUSO Chemical which contains 42.9 weight percent of silica in toluene with the average particle diameter of 19 nm.

Other viscosifiers useful in adhesive formulation embodiments of the present invention are polyisobutylene elastomers for example Oppanol® from BASF; copolymers of styrene and isobutylene for example Sibstar® from Kaneka; EPDM rubber for example Nordel® from DuPont Dow Elastomer; ethylene-octene copolymer for example Engage® from Du Pont Dow Elastomers; styrene butadiene copolymer for example Kraton® from Kraton Polymers and others.

It should be noted that such other viscosifiers can be used to improve the impact properties of the polymeric compositions after curing, that is to say, lower the Modulus. Thus, tailoring the Modulus to a desired value is enabled.

Thixotropic Additives

Thixotropic agents are useful additives to substantially increase the viscosity of a formulation. Thixotropic agents are unique in that they generally do not modify viscosity of a formulation immediately after its addition, but upon dispensing a formulation containing a thixotropic agent becomes highly viscous and will generally retain its shape. Greater flexibility may be exercised in choosing a thixotropic agent for adhesive compositions. For encapsulants or underfill, however, if a thixotropic agent is employed, it may be necessary, depending on the application needs, to select a material that has an appropriate refractive index so that the composition will retain optical properties after curing.

Illustrative examples of thixotropic agents are Cabosil® M5, Cabosil® TS610 (which is partially treated and contains a coating) and Cabosil® TS720 (which is fully treated). The thickening mechanism of the different Cabosil® products will differ because of the various degrees of treatment of the materials. In addition to the fumed silica materials mentioned above, microsilica can serve the same purpose. Microsilica ranging from 0.5 μm-25 μm have been used for these applications.

Antioxidants

Any antioxidant that provides the desired stabilization of the polymer composition may be employed in embodiments in accordance with the present invention provided that the antioxidant does not interfere with the addition polymerization catalyst used and with the desired properties of the resulting polymer composition, such as optical properties or adhesive properties. Antioxidants are generally used in an amount of 0.1 to 1.5 wt. % although other amounts may be appropriate. Exemplary antioxidants are Irganox® 1076 and Irganox® 1010 (Ciba Specialty Chemicals) and are disclosed in U.S. Pat. Nos. 3,330,859 and 3,644,482, which are incorporated herein by reference. In addition, other useful antioxidants are BHT (butylated hydroxytoluene) and Ethanox®, sold by Albemarle, which contains two BHT molecules. It has also been found that some antioxidants act as plasticizers and for that purpose and where such is desirable, additional amounts of the antioxidant may be incorporated, for example, as much as 3, 5 or even 10 wt. %. Irganox® 1076 and BHT are exemplary antioxidants that also function well as plasticizers.

It is often desirable to employ a synergist with an antioxidant which enhances the stabilizing effectiveness of the antioxidant. Examples of synergistic compounds are sulfur-containing esters such as DSTDP (distearyl thiodipropionate), DLTDP (dilauryl thiodipropionate) or aromatic phosphites such as Irgafos® 168 (tris(3,5-di-t-butyl-phenyl)phosphite). Also useful may be UV light stabilizers such as hindered amine compounds as, for example, TINUVIN® light stabilizers.

Pigments

Pigments are not generally useful in encapsulant formulations or any other formulations where optically clear materials or films are required. However pigments may be useful in certain formulations where colored formulations or materials may be useful as a convenience. Pigments are not generally useful as functional materials to give any particular performance or functional property, but they may be useful to give a contrast to a component containing the pigment or to a component that is used in an electronic device. For example, if a two-component catalyst is employed, it would be useful to have a yellow pigment with one component of the catalyst and a blue pigment with the second component so that when the two components are joined (mixed) it is easier to monitor the consistency of the mixing simply by monitoring the color of the mixture.

Other Additives

Depending on the specific properties desired, other additives may be added to the formulation embodiments of this invention. An exemplary advantageous additive is an adhesion promoter, for example aminopropyl trimethoxysilane or epoxy-type adhesion promoters Silquest® A186 or A187.

Particularly useful in formulation embodiments of the present invention are additives that serve as a "shrinkage compensating agent". As mentioned earlier, thermoset adhesives generally experience shrinkage during cure. Such a "shrinkage compensating agent," which can be any thermoplastic polymer that is compatible with the polymer formulation to which it is added and has a melting point close to the cure (polymerization) temperature of such formulation can be used. One example of such an agent is micronized polyethylene (such as MPP550 available from Micro Powders, Inc) which melts around the curing temperature of an adhesive formulation and the melting PE overlaps and expands into the area of the shrinking adhesive formulation during the cure stage.

Other additives that may be added to the formulations of this invention are electrically or thermally conductive fillers, toughening agents, plasticizers, agents effective for reducing the coefficient of thermal expansion (CTE), and the like.

EXAMPLES

The following examples are presented to illustrate in greater detail embodiments in accordance with the present invention. The examples contain detailed descriptions of the preparation and various uses of the compositions of such embodiments of the present invention. The examples are presented for illustrative purposes only and it should be understood that such examples do not limit or restrict the scope of the present invention to what is exemplified. All the percentages and parts are by weight, unless otherwise indicated.

Examples 1-6

Monomer Synthesis

Examples 1-6 are directed to the synthesis of exemplary monomers employed in embodiments in accordance with the present invention.

Example 1

Synthesis of Norborneneethyl Dimethyl Chlorosilane

Vinyl norbornene (VNB, 50 g, 0.528 mol.) was added to a 3-neck flask along with chloroplatinic acid catalyst (0.01 g) dissolved in a minimal amount of isopropanol. The solution was heated to 70-75° C. Chlorodimethyl silane (63.4 g, 0.528 mol.) was then introduced dropwise into the reaction mixture using an addition funnel. Reaction was maintained at 70° C. for about 12 h following which it was checked by gas chromatography (GC). Unreacted VNB was removed under vacuum. At this point in time, the product was present at >95% purity by GC.

Example 2

Synthesis of Norborneneethyl Dimethyl Methoxy Silane (Methoxysilyl NB)

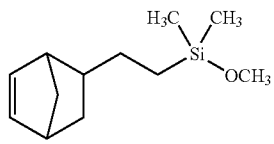

42.73 g of norborneneethyl dimethyl chlorosilane was added drop wise to a round bottom flask containing 200 ml of toluene, 33 ml of triethylamine and 6 ml of methanol. The reaction was allowed to stir for 2 hrs using an overhead stirrer at room temperature. Following this, the salts were filtered off using a Buchner funnel and the filtrate was concentrated using rotary evaporation. The crude material was then distilled under vacuum to complete purification. Final Yield ~74%

Example 3

Synthesis of Norborneneethyl Dimethyl Methoxyethoxy Silane (Methoxyethoxy Silyl NB)

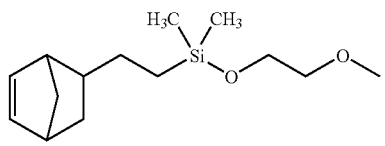

50 gm of norborneneethyl dimethyl chlorosilane was added drop wise to a round bottom flask containing 200 ml of toluene, 42 ml of triethylamine and 20 ml of 2-methoxy ethanol. The reaction mixture was allowed to stir for 2 hrs using an over head stirrer at room temperature. Following this, the salts were filtered off using a Buchner funnel. Additionally in order to ensure complete removal of salts, water wash was carried out in a separatory funnel 4 times (each time 200 ml). The toluene phase was then separated and dried using magnesium sulfate. Filtrate was collected and toluene was removed using rotary evaporation. The crude material was then distilled under vacuum to complete purification. Final yield ~68%.

Example 4

Synthesis of Norborneneethyl Dimethyl Acetoxy Silane (Methyl Acetate Silyl NB)

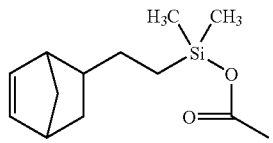

Glacial acetic acid (8.38 g) was introduced drop wise into a round bottom flask containing 200 ml of toluene, triethylamine (15.6 g), norborneneethyl dimethyl chlorosilane (30 g). the reaction was allowed to stir for an additional 2 hrs using an over head stirrer at room temperature. The salts formed were then filtered using a Buchner funnel and the filtrate was concentrated using rotary evaporation. The product was purified by distillation. Final yield ~70%.

Example 5

Synthesis of Norborneneethyl Dimethyl Glycidoxy Silane (Epoxy Silyl NB)

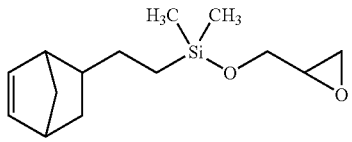

Glycidol (10.35 g) was added drop wise into a round bottom flask containing 200 ml of toluene, triethylamine (15.6 gm) and norborneneethyl dimethyl chlorosilane (30 gm). The reaction mixture was allowed to stir or 2 hrs using an over head stirrer at room temperature. The salts formed in the reaction were then filtered off using a Buchner funnel and the filtrate was concentrated using rotary evaporation. The final product was purified by vacuum distillation. Final yield ~75%

Example 6

Synthesis of Norborneneethyl Dimethyl (Norbornane Methoxy) Silane (Norbornane Silane NB)

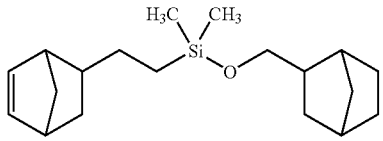

Norborneneethyl dimethyl chlorosilane (75 gm) is introduced drop wise into a round bottom flask containing 300 ml of toluene, triethylamine (63 g) and Norbornane methanol (44.2 mL). The reaction mixture was stirred for 2 hrs using an over head stirrer at room temperature. The salts that were formed were filtered using a Buchner funnel. This was followed by 4×100 mL water wash to ensure removal of salts. The toluene phase is separated, dried using anhydrous magnesium sulfate and concentrated by rotary evaporation. The crude material is then purified by vacuum distillation (130-135° C. at 0.5 mm Hg).

In the following Examples many compositions/formulations are presented to illustrate exemplary embodiments of the present invention. In the preparation of such compositions/formulations, a variety of component materials/ingredients are employed. To simplify the presentation of these Examples, the listing of shorthand abbreviations for such materials/ingredients, with an appropriate chemical name and/or designation, is provided below:

a). M1 decyl norbornene (Decyl NB)
b). M2 dihydrodicyclopentadiene ($H_2$DCPD)
c). M3 norborneneethyl dimethyl methoxy silane
d). M4 norborneneethyl dimethyl methoxyethoxy silane
e). M5 norborneneethyl dimethyl acetoxy silane
f). M6 methyl glycidyl ether norbornene (MGENB)
g). M7 norborneneethyl dimethyl (norbornane methoxy) silane
h). M8 norborneneethyl dimethyl glycidoxy silane
i). M9 5-norbornene-2-(1,1,1-trifluo-2-trifluoromethyl-propane-2-ol) (HFANB)
j). M10 phenethyl norbornene (PENB)
k). M11 tetracyclododecadiene (TDD)
l). M12 trimethoxysilylethyl norbornene (TMSENB)
m). M13 trimethoxysilyl norbornene (TMSNB)
n). M14 bis(norbornene methoxy)dimethylsilane (crosslinker)
o). PC(A): (acetonitrile) bis(triisopropylphosphine) palladium (acetate)tetrakis(penta fluorophenyl) borate; Pd-1206.
p). PC(B): (acetonitrile) bis(tricyclohexylphosphine)palladium (acetate)tetrakis(penta fluorophenyl) borate; Pd-1446.
q). PC(C): bis(triisopropylphosphine)palladium(II)bis(acetate); Pd-545.
r). PC(D): Palladium acetate; Pd-224.
s). CC(A): Dimethyl(2-(2-naphthyl)-oxoethyl)sulfonium tetrakis (pentafluorophenyl) borate; TAG-372.
t). CC(B): N,N-Dimethylanilinium tetrakis(pentafluorophenyl) borate; DANFABA.
u). V-A: 70/30 copolymer of M1/M6, Mw is approximately 70K
v). V-B: 78/22 wt % mixture of spherical silicas PLV-6 and SO-E2 (Tatsumori Silica).
w). V-C: 80/20 copolymer of M1/M13, Mw is approximately 500K
x). V-D: 75/25 wt % mixture of spherical silicas TSS-6 and SO-E2 (Tatsumori Silica).
NOTES: (1) The median diameters of PLV-6 and SO-E2 are about 5 μm and 0.5 μm, respectively.
(2) The median diameters of TSS-6 and SO-E2 are about 4.6 μm and 0.5 μm, respectively.
(3) Before use, silicas V-B and V-D were surface treated in 100 g batches using the following exemplary method: stirring each silica mixture for 12 hours with 1 wt. % of NB-hexyl-trimethoxysilane in a large excess of ethanol in the presence of a small amount of acetic acid. After isolation by filtration and washing with a large excess of ethanol, each silica mixture was dried under vacuum for 8 hours at 120° C. Other surface treatment agents, such as 5-norbornene-2-trimethoxy silane, 5-norbornene-2-butyl trimethoxy silane, 5-norbornene-2-ethyl trimethoxy silane or dodecyltrimethoxysilane can be used in place of the NB-hexyl-trimethoxysilane discussed above.
y). BCE: bis(cyclohexane epoxide)/3,4-epoxycyclohexyl-methyl-3,4-epoxycyclo-hexane carboxylate.
z). AO: n-octadecyl β-(3,5-di-t-butyl-4-hydroxy-phenyl) propionate (Irganox® 1076, an antioxidant).
aa). SYN: tris(3,5-di-t-butyl-phenyl)phosphite (Irgafos® 168, an antioxidant synergist).
bb). CA: Cabosil® M5, fumed silica, of Cabot Corp.

Examples 7-19

Encapsulant Formulations

For each of Examples 7-19, one of V-A or V-C, AO and SYN were dissolved in a mixture of the indicated monomers, see Table 1 below (all values are weights in grams), hear mixing at 5,000 rpm for 30 minutes. Afterwards, a 100 micron film was cast m each monomer formulation. Exemplary curing conditions for such cast films are provided for Examples 7-10 (some cured films received a post-cure bake) and the visual appearance of the cured film recorded. All temperatures indicated below are oven temperatures.

TABLE 1

| Ex | V* | M1 | M3 | M4 | M5 | M7 | M8 | M12 | M13/M10** | BCE | PC*** | CC**** | AO | SYN |
|---|---|---|---|---|---|---|---|---|---|---|---|---|---|---|
| 7 | 15(A) | 27.81 | | | | | | 7.19 | | | 0.007 | 0.022 | 0.50 | 0.125 |
| 8 | 10(A) | 24.59 | | | | | | 8.48 | 6.90 | | .007 | 0.022 | 0.50 | 0.125 |
| 9 | 10(A) | 24.59 | | | | | | 8.48 | 6.90 | 2.5 | .010 | 0.064 | 0.50 | 0.125 |
| 10 | 10(A) | 24.59 | | | | | | 8.48 | 6.90 | 2.5 | .010 | 0.022 | 0.50 | 0.125 |
| 11 | 5.0(A) | 43.70 | | | | | | 11.30 | | | .014 | 0.034 | 0.60 | 0.15 |
| 12 | 6.0(C) | 32.39 | 4.15 | | | | | | 8.46 | | 0.0025 | 0.0063 | 0.5 | 0.125 |
| 13 | 6.0(C) | 37.95 | 4.87 | | | | | 11.21 | | | 0.0025 | 0.0062 | 0.6 | 0.15 |
| 14 | 5.0(C) | 31.78 | | 4.93 | | | | | 8.30 | | 0.0025 | 0.0063 | 0.5 | 0.13 |
| 15 | 6.0(C) | 37.25 | | 5.78 | | | | 11.00 | | | 0.0025 | 0.0062 | 0.6 | 0.15 |
| 16 | — | 4.00 | | | 0.10 | | | 0.93 | | | 0.0012 | 0.0031 | 0.05 | 0.013 |
| 17 | — | 4.00 | | | | | 0.27 | 0.778 | | | 0.0012 | 0.0031 | 0.05 | 0.013 |
| 18 | — | — | | | | 4.17 | | 0.83 | | | 0.0001 | 0.0025 | 0.05 | 0.013 |
| 19 | 6.0(C) | 42.91 | 60.0 | | | | | 11.09 | | | 0.0012 | 0.0031 | 0.6 | 0.15 |

*Ex. 7–11 used V-A, Ex.12–15 and 19 used V-C
**Ex. 8–10 use M10, Ex. 12 and 14 use M13
***Ex. 7–8 used PC-A, Ex. 9–10 used PC-B
****Ex. 10 used CC-B, all others used CC-A In Example 7 the cast film was first cured at 100° C. for 0.5 hr. and the second cured at 150° C. for 1 hr.

In Example 8, the cast film was cured as in Example 7 and further post cure baked at 200° C. for 0.5 hr.

For each of Examples 9 and 10, the cast films were cured as in Example 7, except that the first cure temperature was 110° C.

Other than the film of Example 7, which was hazy, all films appeared optically transparent. In addition, the films of Examples 11-13 and 15 were colorless, while the films of Examples 14 and 16-19 were slightly yellow.

Examples 20 and 21

In Examples 20 and 21, films were formed by casting the formulations shown in Table 2, below, on substrate placed on a first hot plate until the formulation gelled and then transferred to a second hot plate. The formulations were prepared in a manner analogous to that described for Examples 7-19, above. The first cure was at 100° C. for 0.5 hr; the second cure at 150° C. for 1 hr., and a post cure bake at 200° C. for 0.5 hr. was employed. The cured films were opaque, however, despite the opacity noted, such films are useful for encapsulating certain types of white LEDs. For example, white LEDs employing a blue LED die in combination with a yellow phosphor dispersed in the encapsulant formulation.

TABLE 2

| Ex | SO-E2* | M1 | M12 | PC | CC | AO | SYN |
|---|---|---|---|---|---|---|---|
| Ex. 20 | 40 | 43.70 | 11.30 | 0.014 (B) | 0.034(A) | 0.60 | 0.15 |
| Ex. 21 | 40 | 43.70 | 11.30 | 0.014 (B) | 0.034(A) | 0.60 | 0.15 |

*SO-E2 is a spherical silica (median diameter of 0.5 μm) from Tatsumori Silica

Examples 22-26

Encapsulant Formulations Containing Dihydrodicyclopentadiene (M2)

In Examples 22-26 below, plaques (about 1 mm thick) were formed by casting the formulations shown in Table 3, below, on substrate placed on a first hot plate. The formulations were prepared in a manner analogous to that described for Examples 7-19, above. The cure conditions were as follows, the first hot plate was maintained at 80° C. until a gel was formed, then the substrate was moved to a second hot plate, maintained at 125° C., for 6 minutes after which the substrate was removed and allowed to cool. All of the samples were clear and transparent.

After completing the curing process, two portions of the film were removed from the substrate and weighed. One weighed portion was placed into toluene and the other into terpenol and after 24 hours removed. The upper and lower surfaces of these removed portions were wiped to remove excess solvent and the portions re-weighed. Any negative value is believed to be the result of the dissolution of low molecular weight components of the cured film in the toluene and/or terpenol. A positive value is believed to indicate that some toluene and/or terpenol was absorbed.

Table 3, below, provides the polymer composition and procatalyst employed for each example (values are weight in grams). In addition, the gel time at 80° C. (in min. and sec.) and the percent (%) weight change (gain or loss) are also provided.

TABLE 3

| | | | | | | % Wt. Change | |
|---|---|---|---|---|---|---|---|
| Ex. | M2 | M11 | M14 | PC (A) | Gel T | Toluene | Terpenol |
| 22 | 1 | | | $3.59 \times 10^{-4}$ | 9 m 10 s | 8.4 | −4.5 |
| 23 | 0.88 | 0.12 | | $3.53 \times 10^{-4}$ | 12 m 40 s | −18.6 | −21.2 |
| 24 | 0.77 | 0.23 | | $3.47 \times 10^{-4}$ | 14 m 50 s | −21.8 | −21.5 |
| 25 | 0.80 | | 0.20 | $3.19 \times 10^{-4}$ | 5 m 10 s | 0.9 | 11.4 |
| 26 | 0.64 | | 0.36 | $2.87 \times 10^{-4}$ | 6 m 00 s | 3.1 | 11.1 |

Examples 27-30

Underfill Formulations

Examples 27-30, below, describe the preparation of formulations of various compositions useful as underfill materials and the formation of polymer composites thereof.

Example 27

Curing of 70 wt. % Silica (V-B)/30 wt. % Trimethoxysilyl Norbornene (M13) Composite 14 g of surface treated micro silica V-B was shear mixed with 6 g of M13, containing 0.06 g of AO and 0.015 g of SYN predissolved therein, and 0.6 g of M9 for a period of 15 minutes at 6000 rpm. To this mixture, a solution of PC(D) (0.00025 g) in dichloromethane, tricyclohexyl phosphine (0.00031 g) and CC(B) (0.0036 g) was added and further shear mixed for an additional 5 minutes degassing under vacuum until bubble formation ceased. The resulting formulation had a viscosity of about 2500 cPs at 25° C. and about 250 cPs at 90° C.

The mixture was then poured onto an aluminum pan and first cured in an oven at 85° C. for 30 minutes followed a second curing at 150° C. for 1 hour. Monomer weight loss during cure was measured to be 3% by weight. After curing a hard, opaque plaque was obtained.

The plaque was characterized and found to have an average CTE (Coefficient of Thermal Expansion) of 30 ppm (25° C.-250° C.); excellent adhesion to silicon nitride (passed pressure cooker test (121° C., 100% RH, 2 atm for 168 h)); good adhesion to BT-laminate (benzyl triazole) and FR4[2]; a Tg (glass transition temperature) of 370° C. and a Modulus of 5 GPa at 25° C. In addition the material displayed the ability to flow 20 mm in less than one minute at 90° C. at a gap height of 75 μm. This is a requirement for capillary flow underfill.

[2]FR-4 PCB Laminate is the most commonly used base material for printed circuit boards. The "FR" means Flame Retardant (to UL94V-0), and Type "4" indicates woven glass reinforced epoxy resin.

Example 28

Curing of 80 wt. % Silica (V-B)/20 wt. % Trimethoxysilyl Ethyl Norbornene(M12)Composite 16 g of surface treated micro silica V-B was shear mixed with 4 g of M12, containing 0.06 g of AO and 0.015 g of SYN and 0.2 g of a surfactant, EFKA 2722 (a proprietary EFKA additive) predissolved therein, for a period of 15 minutes at 6000 rpm To this mixture, was added a solution of PC-(C) (0.00054 g) in dichloromethane and CC-(B)(0.0032 g). This mixture was further shear mixed for an additional 5 minutes and then degassed under vacuum.

The mixture was then poured onto an aluminum pan and pre cured at 65° C. for 30 minutes followed by a final cure at 150° C. for 1 hour. This resulted in a hard, opaque plaque.

Example 29

Curing of 70 wt. % Silica (V-B)/30 wt. % of Trimethoxvsilyl Norbornene(M12) Composite with BUNA Viscosifier 14 g of surface treated micro silica (V-B) was shear mixed with a solution of 0.12 g of BUNA rubber T9650 (Bayer Corp.) dissolved in 5.88 g of M12, containing 0.06 g of AO and 0.015 g of SYN, 0.6 g of a surfactant (EFKA 2722), 0.6 g M9 predissolved therein, for a period of 15 minutes at 6000 rpm. (The purpose of the BUNA rubber was to help prevent settling of the silica particles). To this mixture, was added a solution of PC(D) (0.00025 g) and tricyclohexyl phosphine (0.00031 g) and CC-(B) (0.0036 g), all of which were dissolved in minimal amounts of dichloromethane. The resulting mixture was further shear mixed for an additional 5 minutes and then degassed under vacuum.

Then the mixture was then poured onto an aluminum pan and pre cured at 85° C. for 30 minutes followed by a final cure at 150° C. for 1 hour. This resulted in a hard, opaque plaque.

Example 30

Curing of 70 wt. % Silica (V-D)/30 wt. % 50:50 Dihydrodicyclopentadiene (M2)/Trimethoxysilyl (M13) Norbornene Composite M2 (2.31 g) and M13 (3.69 g) were mixed with 14 g of V-D. This mixture was shear mixed at 2500 rpm for 35 minutes. To this mixture was added CC-B (0.0039 g) dissolved in minimal amount of dichloromethane and shear mixed for an additional minute. Upon cooling to ambient temperature, was added a solution of PC-B (0.0036 g) in minimal amount of dichloromethane and shear mixed well his formulation was then degassed for 10 minutes and cured in an oven by heating at 85° C. for 30 minutes and 1 hour at 150° C. This resulted in a hard, opaque plaque.

Examples 31-33

Adhesive Formulations

Examples 31-33 are exemplary embodiments in accordance with the present invention that are directed to adhesive formulations.

Example 31

Preparation and Testing of Formulations 1 and 2

Adhesive Formulations 1 and 2 were prepared by first shear mixing, for about 30 minutes at 5,000 rpm, a solution of V-C and the amounts of M1 and M13 according to the following procedure:

A solution of polymer V-C and the indicated amounts of M1 and M13 were prepared by shear mixing for about 30 minutes at 5,000 rpm. Thereafter, a thixotropic additive CA was added to the aforementioned solution and shear mixed until a uniform mixture was obtained. (for storage, cooling to −20° is desirable). The order of addition of the components of each formulation and the weight of such materials is provided in Table 4, below.

Before depositing the formulation to a substrate, it was first degassed under vacuum until visible bubbling ceased (about 30 min) and then an appropriate amount was drawn into a syringe. After filling the syringe, thin beads of the formulation were dispensed onto samples of a dry polyphenylene sulfide (PPS) surface and cured by first heating the PPS substrate in an oven set at 95° C. for 30 minutes and then second heating in an oven set at 130° C. for 30 minutes. The cured heads were soaked for 1 week and 2 weeks in Cyan ink at 70° C.

TABLE 4

| Order of Addition | Ingredients | Formulation 1 Weight (g) | Formulation 2 Weight (g) |
|---|---|---|---|
| 1 | M1 | 75.70 | 40.40 |
| 1 | M6* | 5.0 | 5.0 |
| 1 | M10** | — | 34.13 |
| 1 | M13 | 17.30 | 18.47 |
| 1 | V-C | 6.0 | 6.0 |
| 2 | AO | 1.0 | 1.0 |
| 2 | Titanium Dioxide TiPure ® | 0.25 | 0.25 |

TABLE 4-continued

| Order of Addition | Ingredients | Formulation 1 Weight (g) | Formulation 2 Weight (g) |
|---|---|---|---|
| 2 | FC&C Blue 1 A1 Lake | 0.025 | 0.025 |
| 2 | FD&C Yellow 5 A1 Lake | 0.05 | 0.05 |
| 3 | CA | 5.5 | 5.5 |
| 4 | PC(A) | 0.049 | 0.052 |
| 4 | CC(B) | 0.065 | 0.069 |

*This monomer is employed to improve adhesion and to increase the cross-linking of the system to minimize fluid uptake. In place of M6, other crosslinking monomers mentioned above may be employed.

It should be observed that Formulation 2 contains M10 which is not present in Formulation 1. The incorporation of M10 improves retention of adhesion on polyphenylene sulfide (PPS) substrates, as measured using the Scrape Adhesion Method described below, after a 70° C. ink soak in Cyan ink. The test results, values represent Newtons per millimeter squared (N/mm$^2$), are shown in Table 5 below.

TABLE 5

| Substrate | Formulation | Dry (no ink soak) | 1 week ink soak | 2 week ink soak |
|---|---|---|---|---|
| PPS | Formulation 1 | 5.1 (0.5) | 4.41 (0.38) | 3.64 (0.3) |
| PPS | Formulation 2 | 6.09 (0.52) | 5.65 (0.51) | 6.01 (0.49) |
| Die Backside | Formulation 1 | 5.48 (0.51) | 4.61 (0.69) | 4.50 (0.54) |
| Die Backside | Formulation 2 | 6.15 (0.51) | 7.01 (1.89) | 8.03 (1.70) |

Note: the number in parenthesis indicates the standard deviation.

Adhesion of Formulation 1 and Formulation 2 on other substrates such as aluminum, copper and bismaleimide-triazine(BT) was also investigated using a Lap Shear Method (ASTM D-1002). Improved adhesion was obtained using Formulation 2 as seen in Table 6, below (all values are in N/mm$^2$).

TABLE 6

| | Aluminum | Copper | PPS | BT |
|---|---|---|---|---|
| Formulation 1 | 233 (64) | 361 (28) | 139 (15) | 149 (38) |
| Formulation 2 | 643 (172) | 969 (167) | 301 (70) | 513 (56) |

Note: the number in parenthesis indicates the standard deviation

When 20 phr (parts per hundred) of the crosslinking monomer, M14 is added to either Formulation 1 or 2, the crosslinking density is increased thus improving the chemical resistance of the polymer and minimizing any swelling. For example, swelling after immersion in solvents such as toluene and terpenol is reduced by a factor of 10 or higher.

The effect of moisture on adhesion of Formulation 1 and Formulation 2 on PPS was investigated after soaking according to the JEDEC Level 1 standard testing conditions of storage at 85/85 (% relative humidity and ° C., respectively) for 2 weeks, with a measurement performed after the first week. Adhesion strength was measured by the Scrape Adhesion Method (described below) with the results shown in Table 7 below, (all values are in N/mm$^2$).

TABLE 7

| Substrate | Formulation | Dry (no ink soak) N/mm$^2$ | 1 week 85% RH/ 85° C. | 2 week 85% RH/ 85° C. |
|---|---|---|---|---|
| PPS | Formulation 1 | 4.76 (0.28) | 5.9 (0.43) | 4.9 (0.65) |
| PPS | Formulation 2 | 6.48 (0.32) | 9.95 (0.48) | 9.48 (0.51) |

Note: number in parenthesis indicates the standard deviation

As seen in Table 7, Formulation 1 shows only a modest improvement (24%) after 1 week soaking which drops off after a 2 week soaking. Formulation 2, in contrast, shows a substantial improvement (53%) which is substantially retained after a 2 week soaking.

Scrape Adhesion (Push Test) Method

This is a scrape adhesion test modified from the bond shear module on the Romulus III Universal Tester (Quad Group). The adhesive beads that were cured on the PPS substrate were used to obtain the adhesive strength. The bead's diameter is about 1.5-3.0 mm and its height is about 1.0-1.5 mm. The dimension of PPS plaque is about 25.4 mm×50.8 mm×3.2 mm. The PPS (with beads facing the shear wedge) was mounted using the top mounting bar clamp. Adjust lateral (x-axis), transverse (y-axis) & vertical (z-axis) adjustment knobs, so that the position of the adhesive bead would be under the shear wedge but not in contact with the shear wedge and the PPS. Initiate the computer program and the scraping of the adhesive bead will be performed automatically. The adhesive (breaking) force will be displayed and recorded. The adhesive strength was calculated based on the recorded force divided by the area of the bead.

Example 32

Reduction of Shrinkage of the Adhesive

All thermoset adhesives generally experience some shrinkage during cure. Shrinkage stress generated during cure must be minimized or controlled. High shrinkage stress caused during cure can delaminate the adhesive from the substrate or can cause relative movement between bonded parts. The substrate may break when adhesive shrinkage stress exceeds the tensile strength of the substrate.

In this study, the linear shrinkage of the adhesives having shown compositions were determined by curing a 5 inch by 7 inch by 0.125 inch plaque of adhesive in the Teflon coated plaque mold. The two stage cure profile used was a first heating in an oven set at 95° C. for 30 minutes followed by a second heating in an oven st at 130° C. for another 30 minutes. The molded plaque was allowed to cool to room temperature before taking a final measurement. The change in length of adhesive after cure was measured with a micrometer and the % linear shrinkage calculated from the length of cure part divided by the length of the mold cavity. The compositions of Formulations 3-7 are shown in Table 8, below.

TABLE 8

| | FORMULATIONS WEIGHT (g) | | | | | |
|---|---|---|---|---|---|---|
| Ingredients | 3 | 4 | 5 | 6 | 7a | 7b |
| M1 | 81.39 | 60.56 | 60.56 | 75.70 | 57.74 | 57.74 |
| M10 | | | | | 23.30 | 23.30 |
| M13 | 18.61 | 13.84 | 13.84 | 17.30 | 12.97 | 12.97 |

TABLE 8-continued

| Ingredients | FORMULATIONS WEIGHT (g) | | | | | |
|---|---|---|---|---|---|---|
| | 3 | 4 | 5 | 6 | 7a | 7b |
| V-C | | 4.80 | 4.80 | 6.00 | 6.00 | 6.00 |
| BHT | | 6.40 | 6.40 | | 5.00 | 5.00 |
| AO | | 0.80 | 0.80 | 1.00 | 1.00 | 1.00 |
| MPP550* | | 40.00 | 24.00 | 20.00 | 10.00 | |
| Titanium Dioxide | | | | 0.25 | | |
| FD&C Blue A1 Lake | | | | 0.025 | | |
| FD&C Yellow A1 Lake | | | | 0.05 | | |
| PC(A) | 0.041 | 0.032 | 0.032 | 0.049 | 0.051 | 0.051 |
| CC(B) | 0.058 | 0.043 | 0.043 | 0.065 | 0.067 | 0.067 |
| CA | | | | 5.50 | | |
| Linear Shrinkage** | 1.30% | 0.14% | 0.39% | 0.22% | 0.52% | 1.5% |

*MPP550 is a micronized thermoplastic powder (i.e. micronized low density polyethylene powder) with a mean particle size of from 5 to 7 microns. It has a melting point of 106° C. as determined by DSC.
**As seen, formulations without MPP550 (see, 3 and 7b) exhibit significantly higher linear shrinkage than formulations that include MPP550.

Example 33

Adhesive Formulation

The following is the description of the preparation of two component formulations for a die attach adhesive. Other than being two part compositions, the major difference between two part Formulations 8 and 9 from one of Formulations 1-7 is in the catalyst system. The catalyst system of Formulations 8 and 9 having a shorter working life time. Typically the working life time of a two component formulation ranges from 15 minutes to 2 hours. To provide an indication of whether or not the two parts are mixed with one another, typically each component or part encompasses a dye such that when they are mixed a color change is observed. For exemplary Formulations 8 and 9, component A contained a blue pigment with procatalyst PC(C) and component B contains of a yellow pigment with cocatalyst CC(B) When mixed at a desirable a one-to-one volumetric ratio a green mixture is obtained. While the cure conditions for the formulations can be tailored from as low as 65° C. and up to 150° C. for 1 hour, Formulation 9, containing epoxy norbornene (M6), is generally cured from 110° C. to 150° C. for 1 hour. It is believed that the incorporation of a polar norbornene monomer, such as M6, contributes to better retention of adhesion properties after ink soak.

Formulations 8 and 9 are two component thixotropic formulations that can be syringe dispensed using an Asymtek dispensing machine. The composition of these exemplary formulations is provided in Table 9, below.

TABLE 9

| | Weight (g) Components | | | |
|---|---|---|---|---|
| | Formulation 8 | | Formulation 9 | |
| Ingredients | A | B | A | B |
| M1 | 75.69 | 75.69 | 75.69 | 75.69 |
| M6 | | | 6.0 | 6.0 |
| M13 | 17.31 | 17.31 | 17.31 | 17.31 |
| AO | 1.0 | 1.0 | 1.0 | 1.0 |
| V-C | 6.0 | 6.0 | 6.0 | 6.0 |

TABLE 9-continued

| | Weight (g) Components | | | |
|---|---|---|---|---|
| | Formulation 8 | | Formulation 9 | |
| Ingredients | A | B | A | B |
| FD&C A1 Lake Blue | 0.05 | — | 0.05 | — |
| FD&C A1 Lake Yellow | — | 0.1 | — | 0.1 |
| Titanium Dioxide | 0.25 | 0.25 | 0.25 | 0.25 |
| CA | 5.0 | 5.0 | 5.0 | 5.0 |
| PC(C) | 0.037 | — | 0.037 | — |
| CC(B) | — | 0.22 | — | 0.22 |
| Rhodorsil 2074* | | | — | 0.14 |

*(toly cumyl) iodonium tetrakis (pentafluorophenyl)borate, a photo/thermal acid generator.

Adhesion Data (Scrape test), in Newtons per square millimeter (N/mm²), of Formulations 8 and 9, cured first at 85° C. and second at 150° C., for 30 minutes at each temperature, is provided in Table 10, below.

TABLE 10

| Formulation | Black Ink | | | Magenta Ink | | |
|---|---|---|---|---|---|---|
| | Initial | 10 Days | 20 Days | Initial | 10 Days | 20 Days |
| 8 | 3.91 | 2.91 | 1.23 | 3.91 | 3.88 | 2.57 |
| 9 | 3.86 | 3.07 | 2.64 | 3.86 | 3.68 | 2.97 |

Lap Shear Adhesion (ASTM D-1002) was also investigated on a PPS substrate at the cure conditions noted above. The data, in pounds per square inch (psi), in Table 11 compares adhesion to an oxygen plasma treated PPS surface to a non-surface treated PPS surface.

TABLE 11

| Formulation | Untreated | Oxygen Plasma Treated |
|---|---|---|
| 8 | 358 (+/−38.3) | 1050 (+/−199) |
| 9 | 499 (+/−90) | 1160 (+/−300) |

The present invention has been described with reference to specific details of exemplary embodiments thereof. It will be obvious to those skilled in the art that modifications to any of such exemplary embodiments can be made where such modifications are within the scope and spirit of the present invention. Such modifications can include, among other things, changes in the amounts of specific monomers and/or resultant polymers included in a composition or formulation as well as the addition or deletion of ingredients from the exemplified formulations. For example, it will be understood that while the exemplary embodiments presented above provide specific amounts of each component of a formulation or composition employing a different specific amount for a component, if such a different amount is appropriate, is within the scope and spirit of the present invention. Thus embodiments in accordance with the present invention encompass compositions and/or formulations having a range of from 1 to 98 wt % for monomers represented by any of Formulae I(a), I(b), I(c) or I(d). Thus it will be understood that it is not intended that any details contained in the examples be regarded as limitations except in so far as, and to the effect that, they are included in the claims.

What is claimed is:

1. An encapsulant formulation comprising cycloolefin monomers in the amount of from 60 to 98 wt. %, said monomers in the amount of 20 to 92 wt. % of a cycloolefin monomer of Formula I(a); 5 to 50 wt. % of a cycloolefin monomer of Formula I(b) and 1-50 wt. % of a cycloolefin monomer of Formula I(c)

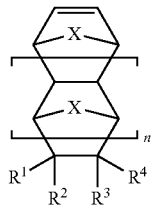

I(a)

where X is —CH$_2$—; n is 0; and one of R$^1$ to R$^4$ is a pendant linear C$_8$ to C$_{12}$ alkyl substituent and the remaining R$^1$ to R$^4$ are hydrogen;

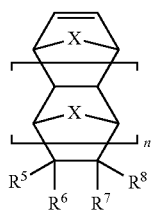

I(b)

where X and n are as defined above and one R$^5$ to R$^8$ is a pendant silyl group of the formula:

—(CH$_2$)$_m$—Si(R$^{13}$)(R$^{14}$)(R$^{15}$)

where m is an integer from 0 to 6, R$^{13}$, R$^{14}$ and R$^{15}$ are each methoxy or ethoxy, and the remaining R$^5$ to R$^6$ is independently selected from hydrogen, C$_1$-C$_3$ alkyl and linear or branched C$_1$-C$_5$ alkoxy;

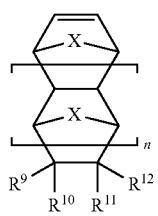

I(c)

where X, m and n are as defined previously and one of R$^9$ to R$^{12}$ is phenethyl or:

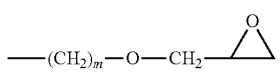
—(CH$_2$)$_m$—O—CH$_2$—(epoxide)

and the remaining of R$^9$ to R$^{12}$ are hydrogen, said composition further comprising;
0.008 to 0.2 wt. % of an addition polymerization procatalyst;
0 to 0.25 wt.% of a cocatalyst;
0 to 45 wt. % of a crosslinking monomer;
0 to 50 wt. % of a norbornene polymer viscosifier;
0 to 50 wt % of a silica viscosifier;
0 to 20 wt. % of a thixotropic additive;
0 to 1.5 wt. % of an antioxidant; and
0 to 0.6 wt. % of an antioxidant synergist;
with the proviso that at least one of a norbornene polymer viscosifier, a silica viscosifier or a thixotropic additive is present and that the total of the components of the formulation add up to 100%.

2. A composition obtained from the polymerization of the formulation of claim 1.

3. An underfill formulation comprising 10 to 60 wt. % of cycloolefin monomers represented by one or more of Formulae I(a), I(b), 0 to 20 wt. % of at least one cycloolefin monomer of Formula I(c) and 0 to 59 wt. % at least one of said cycloolefin monomer of Formula I(d)

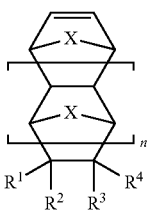

I(a)

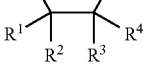

where X represents —CH$_2$—, —CH$_2$CH$_2$—, —O— or —S—; n is an integer from 0 to 5 inclusive; and at least one of R$^1$ to R$^4$ independently represents a pendant linear or branched (C$_4$-C$_{12}$) alkyl substituent and the remaining R$^1$ to R$^4$ is independently selected from hydrogen and C$_1$-C$_3$ alkyl;

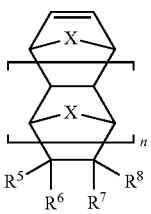

I(b)

where X and n are as defined above and at least one of R$^5$ to R$^8$ independently represents a pendant silyl group of the formula:

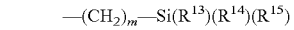
—(CH$_2$)$_m$—Si(R$^{13}$)(R$^{14}$)(R$^{15}$)

where m is an integer from 0 to 6, R$^{13}$ represents linear or branched C$_1$-C$_5$ alkoxy and R$^{14}$ and R$^{15}$ independently represent hydrogen, linear or branched C$_1$-C$_5$ alkyl, and linear or branched C$_1$-C$_5$ alkoxy, and the remaining R$^5$ to R$^8$ is independently selected from hydrogen, C$_1$-C$_3$ alkyl and linear or branched C$_1$-$_5$ alkoxy;

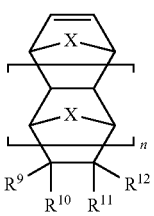

I(c)

where X, m and n are as defined previously and at least one of $R^9$ to $R^{12}$ independently represents hydrogen, $C_1$-$C_3$ alkyl, aryl, —$(CH_2)_m$—O—$R^{16}$, —$(CH_2)_m C(O)OR^{16}$, or the groups:

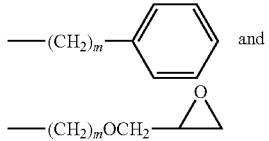

where $R^{16}$ is a linear or branched $C_1$-$C_5$ alkyl group or phenyl;

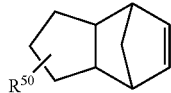

I(d)

where $R^{50}$ is hydrogen or a linear or branched $C_1$ to $C_6$ alkyl;
0.01 to 0.05 wt. % of an addition polymerization procatalyst;
at least 0.001 wt. % of a cocatalyst;
0 to 10 wt. % of a crosslinking monomer;
0 to 50 wt. % of a norbornene polymer viscosifier;
30 to 70 wt % of a silica viscosifier;
0 to 80 wt. % of a thixotropic additive;
0 to 1.5 wt. % of an antioxidant; and
0 to 0.6 wt. % of an antioxidant synergist;
with the proviso that at least one of a norbornene polymer viscosifier, a silica viscosifier or a thixotropic additive is present and that the total of the components of the formulation add up to 100%.

4. The formulation of claim 3, where the X is —$CH_2$—, n is 0, one of $R^1$ to $R^4$ is linear $C_8$ to $C_{12}$ alkyl, and the remaining $R^1$ to $R^4$ are hydrogen; $R^5$ is said pendant silyl group where $R^{13}$, $R^{14}$ and $R^{15}$ are each methoxy or ethoxy; one of $R^9$ to $R^{12}$ is phenethyl or

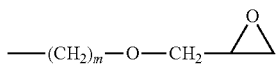

and the remaining $R^9$ to $R^{12}$ are hydrogen.

5. The formulation of claim 4, where said cycloolefin monomers are in the amount of from 20 to 50 wt. % and said monomers contain 20 to 44 wt.% of a cycloolefin monomer of Formula I(a); 5 to 29 wt. % of a cycloolefin monomer of Formula I(b) and 1 to 25 wt. % of a cycloolefin monomer of Formula I(c).

6. A composition obtained from the polymerization of the formulation of claim 3.

7. A composition obtained from the polymerization of the formulation of claim 4.

8. A composition obtained from the polymerization of the formulation of claim 5.

9. An adhesive formulation comprising 70 to 95 wt. % of cycloolefin monomers where such monomers comprise 20 to 89 wt. % of a cycloolefin monomer of Formula I(a); 5 to 49 wt. % of a cycloolefin monomer of Formula I(b), 1-45 wt. % of a cycloolefin monomer of Formula I(c) and 0. to 98 wt. % of a cycloolefin monomer of Formula I(d), where for each of said Formulae I(a)-I(d):

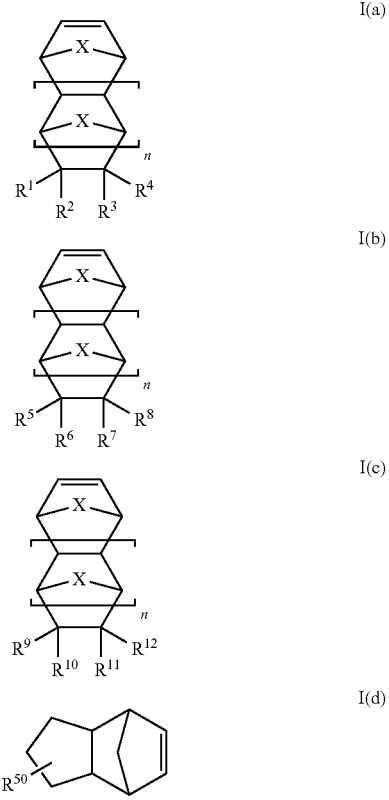

X represents —CH —; n is 0 one of $R^1$ to $R^4$ is a linear $C_8$ to $C_{12}$ alkyl and the remaining $R^1$ to $R^4$ are hydrogen; $R^5$ is a pendant silyl group represented by:

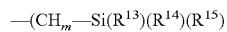

where m is an integer from 0 to 6; and $R^{13}$, $R^{14}$ and $R^{15}$ are each methoxy or ethoxy; one of $R^9$ to $R^{12}$ is phenethyl or

and the remaining $R^9$ to $R^{12}$ are hydrogen and where $R^{50}$ is hydrogen or a linear or branched $C_1$ to $C_6$ alkyl;
0.01 to 0.05 wt. % of an addition Polymerization procatalyst;
at least 0:001 wt. % of a cocatalyst;
0 to 45 wt. % of a crosslinking monomer;
0 to 40 wt. % of a norbornene polymer viscosifier;
0 to 40% of a non-norbornene polymer viscosifier;
0 to 20 wt. % of a thixotropic additive;
0 to 10 wt. % of an antioxidant;
0 to 0.6 wt. % of an antioxidant synergist; and
0 to 1 wt.% of a pigment
with the proviso that at least one of a norbornene polymer viscosifier, a non-norbornene polymer viscosifier or a thixotropic additive is present and that the total of the components of the formulation add up to 100%.

10. A composition obtained from the polymerization of the formulation of claim 9.

11. The formulation of claim 9, wherein said cycloolefin monomer of Formula I(c) comprises phenethyl norbornene.

12. A composition obtained from the polymerization of the formulation of claim 11.

* * * * *